July 21, 1953 L. G. FOWLER 2,645,821
SEPARATOR FOR COTTON HARVESTERS
Filed Aug. 9, 1952 4 Sheets-Sheet 1
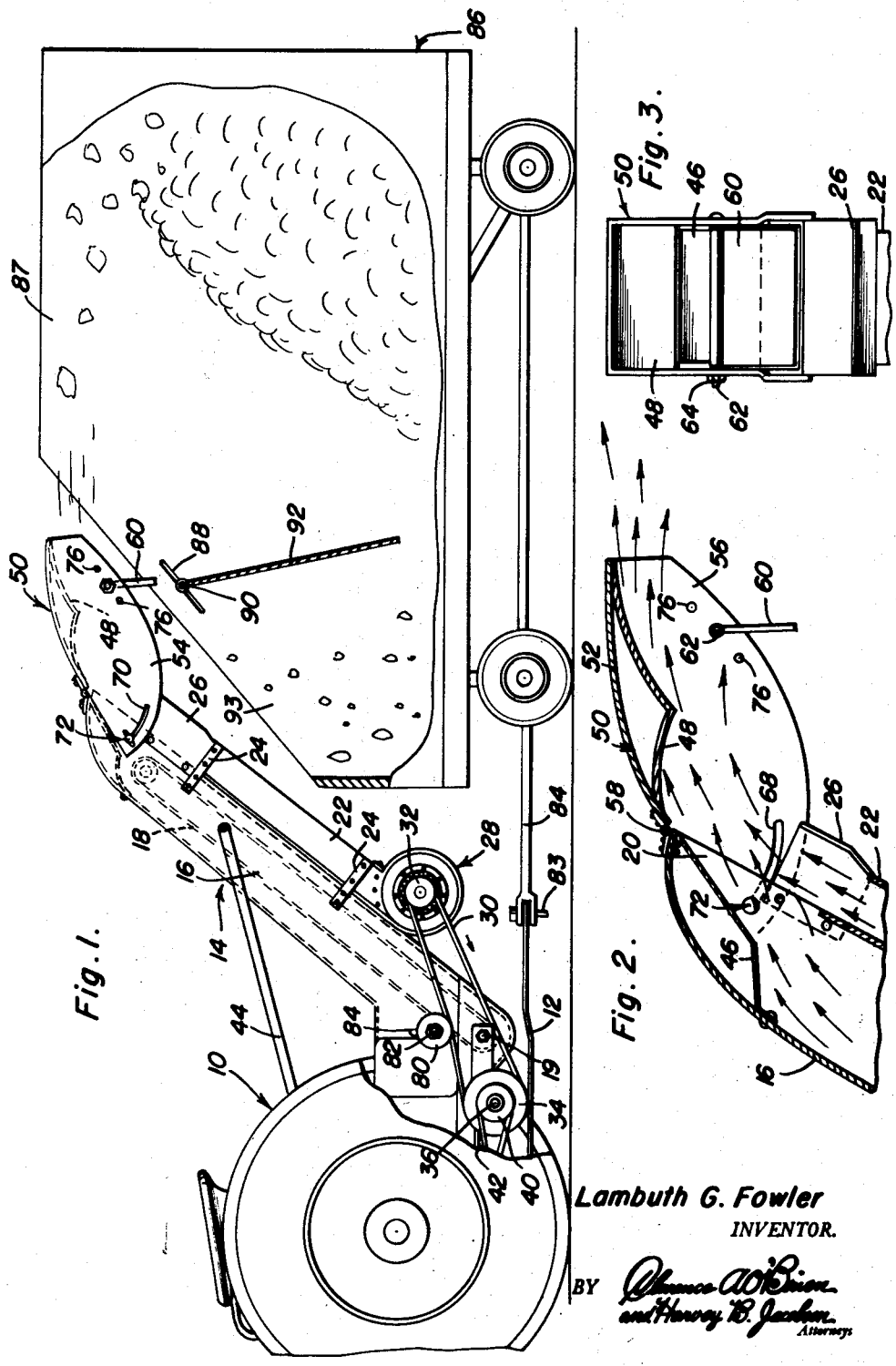
Lambuth G. Fowler
INVENTOR.

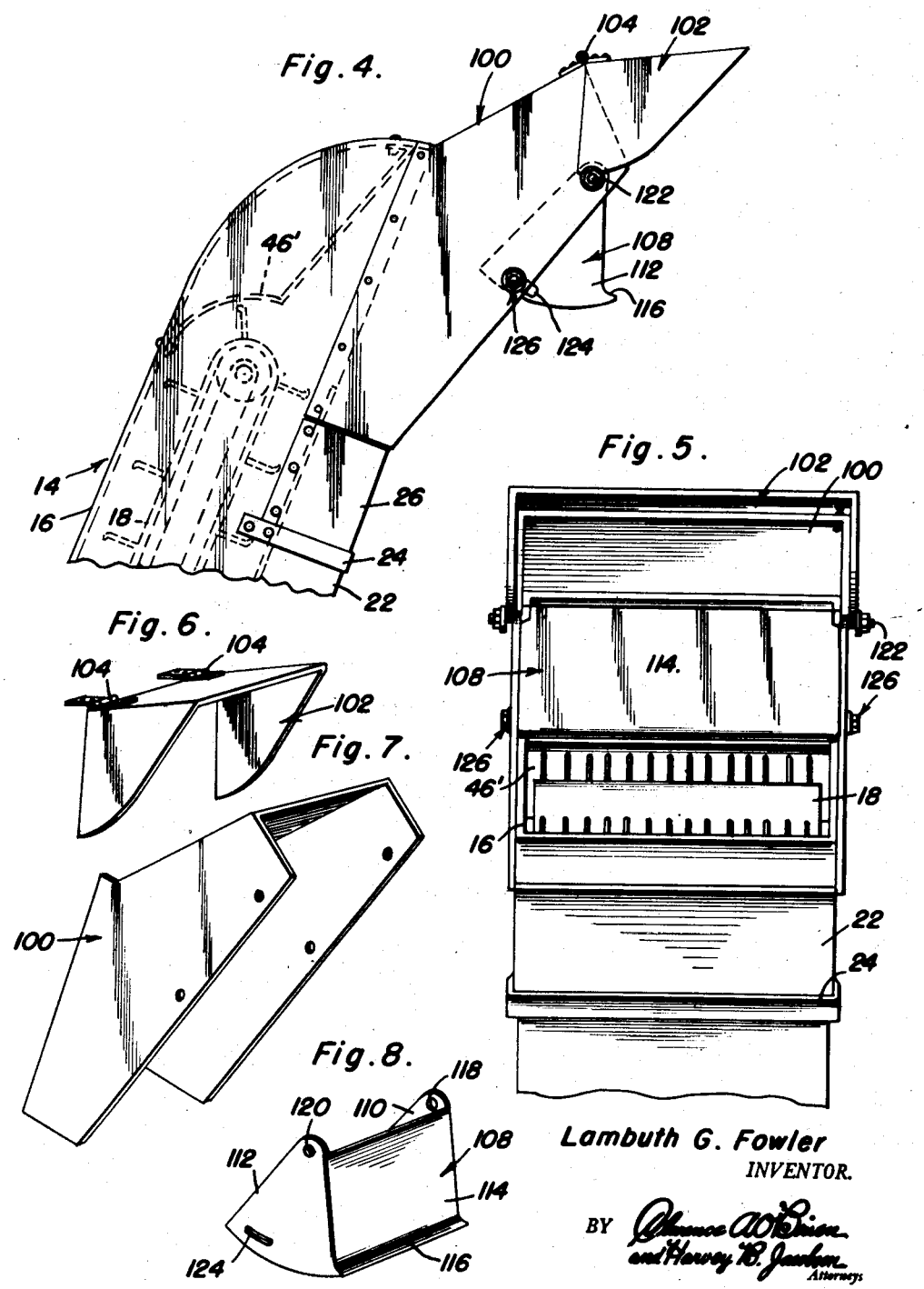

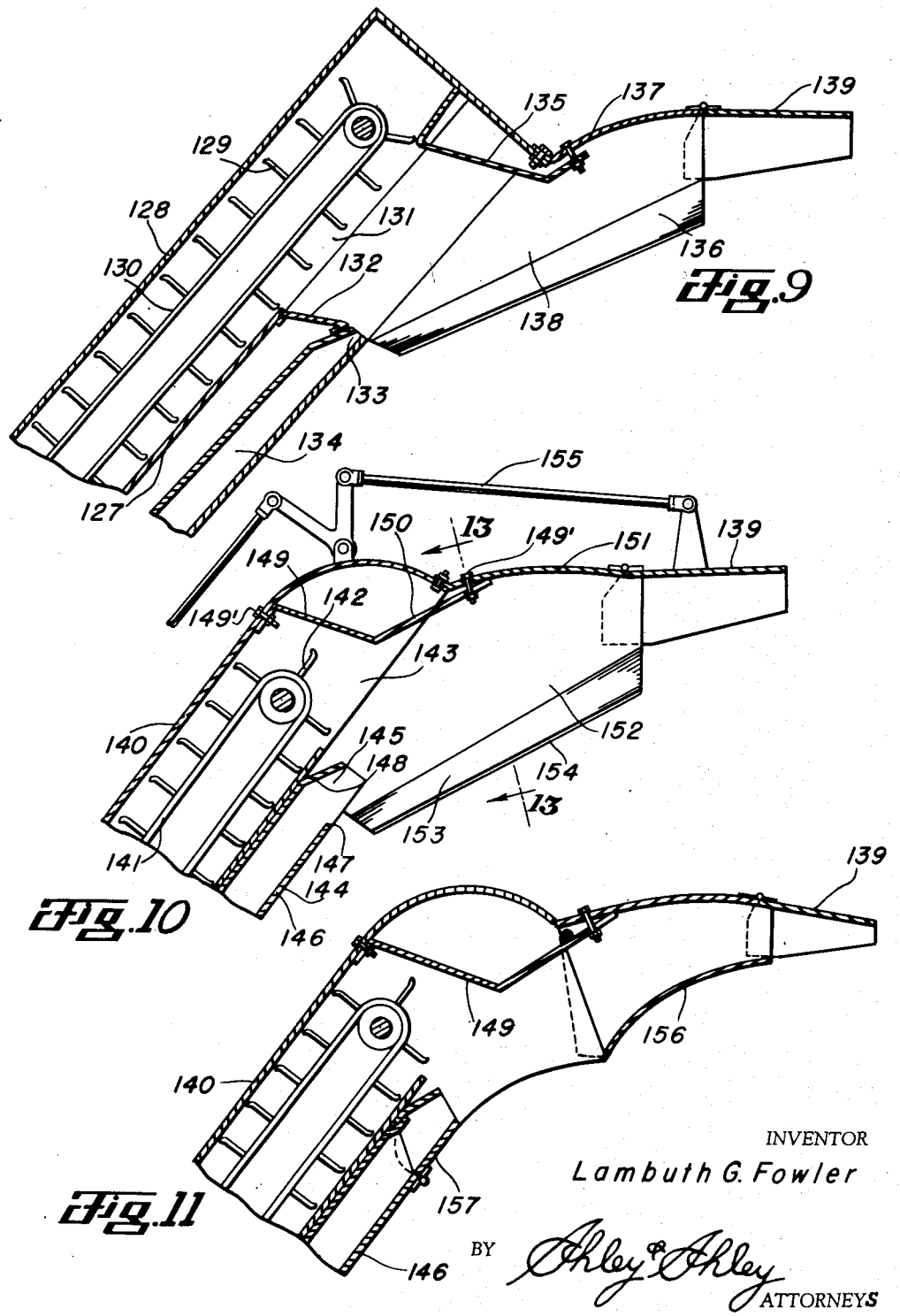

July 21, 1953  L. G. FOWLER  2,645,821
SEPARATOR FOR COTTON HARVESTERS
Filed Aug. 9, 1952  4 Sheets-Sheet 4
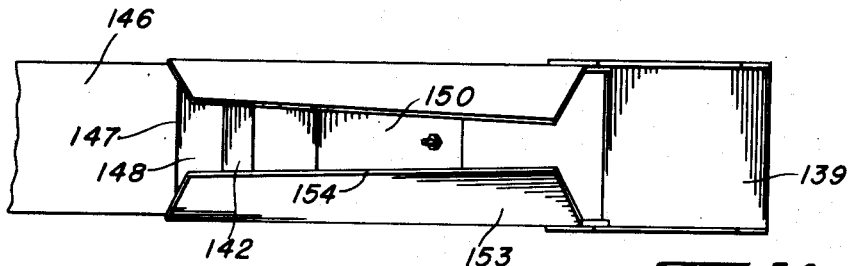
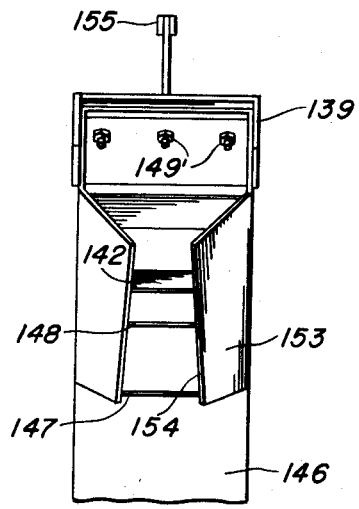
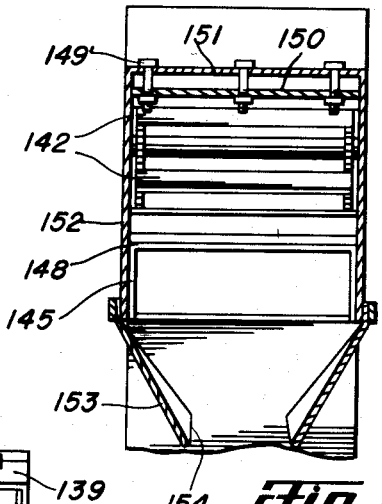
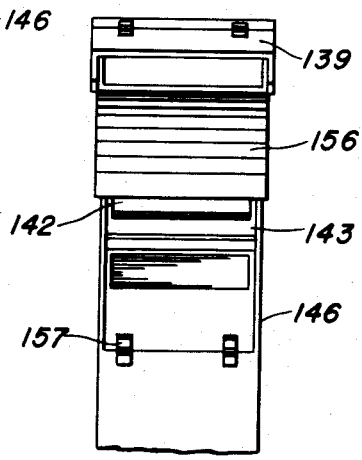
INVENTOR
Lambuth G. Fowler
BY Ahley & Ahley
ATTORNEYS Patented July 21, 1953

2,645,821

UNITED STATES PATENT OFFICE 2,645,821

SEPARATOR FOR COTTON HARVESTERS

Lambuth Groves Fowler, Lubbock, Tex.

Application August 9, 1952, Serial No. 303,562

11 Claims. (Cl. 19—72)

This invention relates to new and useful improvements in cotton cleaners and distributors.

The invention is particularly concerned with cotton cleaning, separating and distributing devices for use in conjunction with mechanical cotton harvesters. In recent years, the employment of mechanical cotton harvesters has increased many fold, and in many localities, cotton harvesters have virtually replaced hand picking or pulling of the cotton. There are several disadvantages, however, which are inherent in the several types of cotton harvesters in use, among them being the inability of the machine to distinguish between ripe or mature cotton and green or immature cotton bolls. The machines also tend to pick up a certain quantity of foreign matter such as rocks, plant stems, and other foreign matter or heavier particles, the net result being the lowering of the quality of the cotton harvested. In many cases, the rocks, sticks, and other foreign matter can be effectively removed before the cotton is ginned, but the green or immature cotton bolls remain as a serious problem and as one of the chief objections to the use of mechanical cotton harvesters. These green or immature bolls are not separated from the ripe or mature bolls prior to ginning, and a relatively small quantity of this immature cotton is sufficient to clog the ordinary ginning machinery. Since the presence of immature bolls renders the cotton less desirable and less easy to gin, such cotton necessarily demands a lower price at the cotton gin.

Because of the objections to the presence of green or immature unopened bolls in the cotton, it has been customary to delay the use of cotton harvesters until all of the cotton bolls are open. This is usually after the first frost and after the cotton plants have defoliated. Manifestly, many of the cotton bolls are mature and open long before this time, and this cotton often suffers a severe loss in quality by standing in the field until all of the bolls are open. The open bolls pick up dust and dirt, dry out, lose weight, grade and staple, and some of the cotton often blows off of the plants and is lost completely.

The present invention permits harvesting of the cotton as soon as a sufficient number of bolls are open (usually 80 per cent or better), thus preventing the above losses and enabling the farmer to gather the cotton at its peak condition and optimum value. The immature bolls are separated and put aside to dry and open so that they can be handled by a cotton gin.

It is, therefore, a particular object of this invention to provide a cleaner and distributor for use in conjunction with cotton harvesters which effectively separates the ripe or mature cotton from the balance of the cotton and other material harvested by the cotton picking machine, and which distributes the mature cotton into a different area or zone from the immature cotton and foreign matter.

Cotton harvesters are customarily operated in conjunction with a trailer into which the cotton is delivered through an upwardly directed elevator or converter. It is important that the mature cotton not only be separated and distributed separately from the balance of the material flowing from the elevator, but also that the mature cotton be directed in a relatively compact stream so that it may be adequately received and contained within the trailer which follows the cotton harvester, the desirable end result being to place all of the mature cotton into the trailer without loss or dispersion of the same outside of the trailer. At the same time, it is desirable that the immature bolls and foreign matter be also deposited in the trailer but at a point different from that at which the mature cotton is placed.

It is, therefore, a particular object of the invention to provide an improved cotton cleaner and distributor which not only separates the mature cotton from the immature cotton and foreign matter and places these two classes of material at different points, but which also directs the two streams of material in a relatively compact and unidirectional path in order that loss and dissipation of the material be avoided.

It has been necessary in the past to employ one or more laborers to stand in the trailer being drawn behind the cotton harvester to distribute the cotton in the trailer and move it toward the rear of the trailer in order that the same may be properly filled. In large trailers, as many as four men are needed for this purpose. The present invention properly distributes the cotton and eliminates the need for these additional laborers.

A further object of the invention is to provide an improved cotton cleaner and distributor adapted to be used in conjunction with a cotton harvester having a cotton elevator, in which provision is made for confining the stream of cotton at the discharge end of the elevator and directing the same in a relatively compact flow path in order that an air stream may be brought into more intimate relationship with the stream of cotton in order to effect the desired cleaning and distribution.

Another object of the invention is to provide an improved cotton cleaner and distributor adapted to be used in conjunction with a cotton harvester having an upwardly directed elevator, the cleaner and distributor including a hood overlying the cotton discharge and having an upwardly curved portion forming a pocket in which cotton momentarily accumulates and is subjected to a rolling or whirling action by the air stream in order to clean and separate the cotton more thoroughly.

An additional object of the invention is to provide a device of the character described in which the hood is provided with depending convergent cheek plates which function to confine and direct the air stream while at the same time allowing the ready and complete separation of immature cotton and foreign matter from the mature cotton bolls.

Still another object of the invention is to provide a device of the character described in which the hood is provided at its rearward portion with a curved bottom plate which further separates and isolates the mature cotton from the immature cotton and enhances the degree of separation obtained.

A further object of this invention is to arrange a hood at the end of the endless conveyor housing which has certain baffles and deflectors therein permitting such separation as detailed above in addition to the discharge of materials which are lighter than the open cotton by permitting a minor component of the air stream to be directed over the top of the trailer which tracks or follows behind the endless conveyor, this minor air stream having leaves and other extremely light impurities suspended therein and carried thereby.

A further object of this invention is to direct the air stream by means of an improved series of baffles which are carried by an outwardly and downwardly opening hood, said hood being fixed to the conveyor housing; and an adjustably located deflector which is adapted to be engaged by the heavier materials.

Other objects and features, as the employment of a specially provided trailer which has a partition therein so disposed with respect to the deflector and with respect to the components of the air stream that bins are formed collecting the open cotton and the heavier, foreign matter, will become manifest in following the description of the illustrated forms of the invention.

A construction designed to carry out the invention will be hereinafter described together with other features of the invention.

The invention will be more readily understood from a reading of the following specification and by reference to the accompanying drawings, wherein an example of the invention is shown, and wherein:

Fig. 1 is a side view of one form of the cleaner and distributor constructed in accordance with this invention, portions being broken away in section to illustrate detail of construction;

Fig. 2 is an enlarged fragmentary sectional view showing the hood together with baffle and deflector arrangement and the air stream pattern;

Fig. 3 is a front view of the structure shown in Fig. 2;

Fig. 4 is an enlarged fragmentary side view of the upper part of an elevator, the air duct which is attached to the elevator or conveyor housing, and the baffle and deflector arrangement;

Fig. 5 is a front view of the structure shown in Fig. 4;

Fig. 6 is a perspective view of a baffle which is employed in connection with the embodiment shown in Fig. 4;

Fig. 7 is a perspective view of the hood which is employed as a part of the invention and is shown in approximate perspective relationship with respect to the elements of Figs. 6 and 8, in part forming an exploded perspective view;

Fig. 8 is a perspective view of the deflector which is employed in connection with the embodiment of the invention shown in Fig. 4;

Fig. 9 is a vertical, sectional view showing the upper portion of a modification of the invention, and in particular, the arrangement of the hood with respect to the cotton elevator;

Figs. 10 and 11 are views similar to Fig. 9 in illustrations further setting forth examples of the invention;

Fig. 12 is a rear end elevation of the form of the invention shown in Fig. 10;

Fig. 13 is a vertical, cross-sectional view taken upon the line 13—13 of Fig. 10;

Fig. 14 is a view in elevation taken from the underside of Fig. 10; and

Fig. 15 is a rear end elevation of the form of the invention shown in Fig. 11.

This application is a continuation-in-part of my co-pending application, Serial No. 136,710, filed January 4, 1950.

Reference to Fig. 1 shows that a part of a conventional tractor, which is generally indicated at 10, is supplied with a conventional drawbar 12, in addition to other structure. Carried by the tractor is an elevator 14 consisting of a housing 16 having an endless conveyor 18 disposed therein. This endless conveyor is operated by means of a driving connection with a power shaft 19, which derives its operation from the tractor. The housing 16 has a discharge opening 20 at the top thereof which is directed rearwardly.

An air duct 22 is fixed, as by means of the brackets 24, to the housing 16 and has a collar 26 at its upper end. This collar forms an air outlet opening for an air stream which is caused by the blower 28. Said blower is attached to the lower end of the air duct 22 and is operated by means of the belt 30 which is entrained around a pulley 32, said pulley 32 being fixed to the blower shaft. The belt is also entrained around a pulley 34 which is secured to a shaft 36 which is suitably mounted at the rear of the tractor. Said shaft 36 is coupled with the shaft 18 by means of sprockets and a chain connection whereby, when the elevator conveyor 16 is operated, the blower 28 is also rendered operative.

As an alternative, when a tractor having a side disposed power take-off is used, the pulley 40 which is fixed to the shaft 36 and which has the belt 42 entrained therearound may be used in order to operate the blower 28.

The elevator 14 may be provided with any number of braces, as the brace 44, wherever it is found necessary for the support of the elevator. Moreover, conventional fastening media are used in attaching the various components together, as rivets, welding, brazing, bolts, and the like. For example, attention is invited to Fig. 4 wherein the collar 26 is illustrated in section. This collar is attached by means of rivets (unnumbered) to the elevator housing 16. However, this collar could be welded or brazed.

When the material is conveyed on the conveyor 16, it reaches the normal discharge opening 20 at the top of the elevator. At the point of egress of the material, as cotton is admixed with stones, leaves, clods of earth, and the like, the air stream passing through the duct 22 admixes with this material, carrying the material suspended in the air stream. The baffle 46 which is substantially V-shaped is disposed at the upper end of the housing 16, forcing the materials to remain downwardly with respect to the elevator.

The air stream mixes with the material as indicated by the arrows in Fig. 2. As this air stream is carried forward in its flow pattern, the air stream engages the V-shaped baffle 46 and then moves outwardly, striking the V-shaped baffle 48 which is secured to the web 50 of the hood 52. Said hood has legs or sides 54 and 56 which extend from the web portion 52, thereby forming a substantially U-shaped, in cross section, hood which is downwardly and forwardly opening. A hinge 58 connects the hood with the upper part of the elevator housing 16. Inasmuch as the baffle 48 is substantially V-shaped including a pair of sides which converge to an apex and the sides are smoothly curved, the air stream striking the first side nearest the discharge outlet 20 deflects it downwardly slightly, while the lower part of the air stream passes below the apex of the baffle 48. The air stream, collecting all of the material which is gathered by the device, moves it in suspension. After the air stream progresses a short distance, the lighter material, as the opened cotton, is retained in the upper position, while the heavier material is pulled downwardly by the force of gravity.

A deflector 60 which consists of a plate is pivoted by the pivot pin 62 between the sides 56 and 54. The baffle, after being adjusted in a selected pivoted position, is maintained in place by tightening the nut 64 on the threaded end of the pivot pin 62, thereby holding the deflector in selected adjusted position.

Since the hood 50 is hinged at 58 to the elevator housing, there must be a means for holding it in place. This means is seen best in Fig. 2, wherein there is a slot 68 in the side 56 and a slot 70 in the side 54 (Fig. 1). Screw and nut assemblies 72 pass through openings in the elevator housing and through the slots so that the nuts in the assemblies may be tightened when the hood 50 is moved to the desired positions or position of adjustment.

The disposition of the deflector 60 is also adjustable. For this purpose, a series of apertures 76 are provided in each side 54 and 56 so that the pivot pin 62 may be removed and replaced in selected pairs of apertures 76.

In operation, the elevator 18 is rendered operative. At the same time, the blower 28 is operative due to the belt 30 connection, which belt is tightened by means of the belt tightener pulley 80 which is operable on a shaft 82 mounted in slot 84. The slot 84 is in an appropriate part of the conventional elevator structure and the nut at the end of the shaft 82 is employed to hold the tightener pulley 80 in place.

As the material is conveyed on the conveyor, it is separated by the operation of the air stream as previously described. The upper component of the air stream which is divided by the action of the baffle 48 and the deflector 60 carries the opened cotton rearwardly of the elevator. The extreme highest portion of the air stream will have the lightest material therein as the leaves and very light foreign articles. Due to the shape of one leg of the baffle 48, this very light material is carried with the uppermost portion of the air stream to be discharged back into the field. The final and lowest part of the air stream strikes the deflector plate 60. More important, however, the heavier objects fall by the pull of gravity downwardly as they are being carried with and by the air stream so that they strike the deflector 60 and fall downwardly.

Attached to the drawbar 12 by means of a coupling pin 83 is the tongue 84 of a wagon or trailer 86. This trailer has casing sides with slots 88 therein. These slots accommodate a pin 90 to which is fixed a partition 92. The partition is disposed in the trailer casing separating it or dividing it into bins 87 and 93. The bin 93 is to collect refuse, while the bin 87 is in substantial alignment with the main portion of the air stream so as to collect the opened cotton. The very fine particles simply blow on top of the bin 87 to be deposited on the ground.

Reference to Fig. 8 shows that the partition 92 is disposed below the deflector plate 60 so that when the rather heavy objects strike the deflector plate, they fall downwardly and into the bin 93.

Reference to Figs. 4–8 shows that a second embodiment of the invention is contemplated. This second embodiment includes the elevator 14 having the housing 16 operatively connected therewith together with the conveyor 18. The baffle 46 is disposed adjacent the discharge opening of the elevator 14 and serves the same purpose in this embodiment as described previously in connection with the embodiment of Fig. 1. A trailer is to be used with this form of the invention as disclosed in connection with the initially described form and in the same capacity.

The hood 100 is of slightly different shape from the hood 50. It is substantially U-shaped in cross-section and is riveted or otherwise rigidly secured to the elevator housing 16. However, the baffle 48 is not employed and in lieu thereof a baffle 102 is used. The baffle 102 is substantially U-shaped in cross-section having a rearward and forward as well as downward opening. The hinge 104 is used to connect the baffle 102 to the hood 100, thereby hingedly mounting the baffle 102 so that the force of the air stream operates it to its proper hinged position, depending upon the rate of flow of air and pressure passing through the ducts 22.

The deflector 108 is seen best in Fig. 8. This deflector has substantially triangular sides 110 and 112 which are connected by a substantially flat web 114 having an outturned edge 116. Apertures 118 and 120, respectively, are provided in the apex portions of the sides 110 and 112, through which passes a pivot pin 122. This pivot pin is carried by the sides of the hood 100 and is disposed below the baffle 102.

Slots 124 are provided in the substantially triangularly shaped sides 110 and 112 and screw and nut assemblies 126 are passed through the sides of the hood 100 and through the slots 124, holding the deflector in selected adjusted positions with the bolt 122 acting as a pivot pin.

In operation of this form of the invention, the air stream 122 passes upwardly into the hood 100. As the heavy material is conveyed, it strikes the curved leg of the baffle 46' so that it is urged substantially horizontally forward. If the air stream is sufficiently potent to carry it upwardly, the heavier materials, as the stones and unopened bolls, strike the side 114 of the deflector 108, allowing gravity to pull this heavier material downwardly. The lighter material, as the opened cotton, is carried by the air stream and forced upwardly through the baffle 102 formed passageway above the deflector 108 for disposition in the bin 87. The extremely light material, as the leaves, is carried forward by the straight uppermost position of the air stream and most of this extremely light material is blown entirely over the trailer 86.

The form of the invention shown in Fig. 9 is particularly adapted for use in conjunction with the type of cotton harvester in which the cotton stream moves upwardly over the lower wall 127 of the harvester elevator 128. Since the paddles 129 of the conveyor 130 do not, in this type of harvester, function to throw the cotton outwardly through the discharge opening 131 of the elevator, and instead, the cotton stream simply falls outwardly through said opening, a slightly modified arrangement of the invention must be provided. In adapting the invention to this type of harvester, an inclined baffle 132 is mounted to project rearwardly from the discharge opening 131 and terminates close to and above the air outlet opening 133 of the air duct 134. A second inclined baffle 135 is positioned in the upper portion of the device so that the air stream 134 will hinge thereon, and a hood 136 projects rearwardly from said baffle. The hood is provided with an upwardly curved top wall 137 and depending side walls 138. An adjustable supplementary hood 139 is pivotally connected to the hood 136 and extends rearwardly from the upper portion thereof.

It will be noted that the air duct 134 is spaced rearwardly at its upper end from bottom 127 of the elevator 128, and that the provision of the baffle 132 causes the stream of cotton to be completely removed from the elevator and its conveyor before being contacted by the stream of air flowing through the air outlet 133. The stream of air picks up the mature cotton, and directs the same along the baffle 135 and through the upper portion of the hood so as to distribute the mature cotton rearwardly of the harvester in a downwardly inclining path so as to fall into the rearward portion of the trailer (not shown) employed customarily in connection with such harvesters. The immature cotton, heavier particles and other foreign matter, being heavier than the mature cotton, fall through the air stream and down through the open bottom of the hood 136. The latter material, will be given some impetus by the air stream and will fall properly into the forward portion of said trailer.

A still further modification of the invention is shown in Fig. 10, this particular modification being preferable in some respects to those previously shown. The cotton is delivered from the harvester upwardly through the elevator 140 by means of the conveyor 141, and is thrown by the paddles 142 of said conveyor through the outlet opening 143. The air stream is directed upwardly through the air duct 144 by the blower previously described, or any other suitable means, and exits through a slightly convergent nozzle 145. It is to be noted that the outer or bottom wall 146 of the air duct is cut away at 147 short of the upper end of the air duct in order that foreign material may not enter said duct when the air stream passing therethrough is of low magnitude. The nozzle 145 thus protects the interior of the duct against material falling vertically downwardly from the discharge opening 143. Nothing passing over the upper edge 148 of the nozzle can enter the air duct but rather falls through the cut away portion 147.

In order to confine and direct the cotton stream, there is provided in the elevator 140 a baffle or shield member 149 which overlies the upper end of the conveyor and prevents the accumulation in the upper end of the elevator housing of a roll or ball of cotton. As shown, the shield 149 is spaced closely to the path of travel of the conveyor and is formed to lie approximately contiguous to said travel. This structure insures the positive discharge of the cotton outwardly through the opening 143.

It is desirable that the shield 149 have a rearwardly and upwardly directed section 150 extending through the opening 143 and joining the upper wall 151 of the hood 152. The hood 152 extends rearwardly and approximately horizontally from the discharge opening 143 and is provided at its rearward end with the supplementary hood member 139, shown in Fig. 9. The upper wall 151 of the hood is preferably arcuate or curved upwardly, while the side walls of the hood are closed. The hood thus receives the stream of air from the duct 146 and deflects the same rearwardly and downwardly with the mature cotton entrained therein. The immature cotton and foreign matter falls downwardly and discharges through the open bottom of the hood.

The shield 149 is desirably mounted for adjustment by having its ends slotted and receiving bolts 149' which secure the shield to the elevator 140 and the hood 151. The bolt and slot arrangement permits longitudinal shifting of the shield, while the thin metal structure of the shield permits the same to be bent or straightened as desired.

The upper wall 151 may either be appropriately dished upwardly adjacent the point of impingement of the air stream thereon, or the merging of the portion 150 of the shield 149 into the top portion 151 may constitute a similar upwardly curved portion. This upwardly curved area, lying contiguous to the air stream has been found to function as a supplementary cleaning means in that a roll of cotton is held momentarily in said area and spun or whirled before passing rearwardly from the hood. This momentary hesitation of the cotton in its travel, and the conversion of its rectilinear movement into a spinning movement not only provides additional time for separation of mature and immature cotton but also provides additional cleaning action due to the rotational movement achieved.

The hood 152 is provided along the lower edges of its side walls with inwardly convergent cheek plates 153. As shown in Fig. 13, the cheek plates 153 converge toward one another but do not have their lower edges touching whereby the hood is still provided with an open bottom. Nevertheless, the cheek plates tend to confine and direct the air stream and prevent its random dispersion. At the same time, the confining in the air stream results in a confining of the stream of mature cotton being ejected rearwardly from the hood whereby scattering and loss of the cotton is avoided, and also confines and directs the separated stream of immature cotton whereby the latter is readily collected and retained for proper maturing.

To enhance the separating and confining action of the cheek plates 153, the lower edges 154 thereof converge toward one another from a point adjacent the discharge opening 143 toward the rearward end of the hood (Fig. 14). This converging in a horizontal plane of the cheek plates has been found advantageous in confining the stream of mature cotton and in insuring that the same be adequately directed and distributed to the rearward end of the following trailer.

The supplementary hood 139 may be provided with a remote control adjusting means 155 comprising conventional link, arm, and bell crank elements.

The structures shown in Figs. 9 and 10 may be modified as shown in Fig. 11 by the incorporation into the hood of a curved bottom wall 156. The forward edge of the wall 156 is spaced rearwardly from the discharge opening 143 so as to provide adequate space for immature cotton and other undesirable material to fall from the air stream, and curves upwardly and rearwardly therefrom to provide a shield for intercepting undesirable material tending to flow rearwardly with the stream of mature cotton. The curved wall 156 may be described as being approximately horizontal, and it is to be noted that it curves upwardly and rearwardly into a horizontal plane at its rearward edge. Immature cotton which may tend to pass rearwardly with the air stream will impinge upon the bottom wall 156 and slide forwardly thereover to be distributed into the desired area. The mature cotton, being lighter and fluffier, will continue to flow with the air stream over the upper surface of the curved bottom wall 156, and will be directed rearwardly into the desired location.

It is also desirable that the nozzle of the air duct be angularly adjustable so as to vary the path of the air stream through the hood either closer to or farther from the top wall of said hood. This is readily accomplished by pivotally mounting the nozzle as shown at 157 in Fig 11. Such angular adjustment of the air outlet nozzle serves to enhance or diminish the supplementary cleaning and separating of the cotton occurring in the curved upper part of the hood as hereinbefore described. Swinging of the nozzle downwardly away from the top of the hood emphasizes the whirling of the cotton in the upper part of the hood while upward swinging of the nozzle reduces such action.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A cotton classifier and cleaner for use in conjunction with a cotton harvester having an upwardly-directed cotton discharge elevator with an elevated discharge opening for directing rearwardly and downwardly of the harvester a stream of cotton comprising mature cotton, immature cotton and heavier bodies, said elevator being of the type having an endless elongate conveyor mounted on shafts in an elongate upwardly-directed housing with a closed upper end overlying the discharge opening and the upper end of the conveyor and closely spaced to the path of travel of the upper end of the conveyor and formed to conform substantially to said path of travel to aid in directing the cotton stream through the discharge opening, said classifier and cleaner including an air duct having an air outlet directed upwardly and rearwardly in close proximity to the discharge opening, the air outlet being arranged to direct its air stream transversely and upwardly through the downwardly and rearwardly moving stream of cotton flowing from the discharge opening, means for blowing a stream of air through the air duct, and a hood overlying the air outlet, said hood having a closed top and closed sides and extending rearwardly from the upper end of the elevator housing for receiving the air stream from the air duct outlet with mature cotton entrained therein and directing the same rearwardly and downwardly from the elevator, the immature cotton and heavier bodies falling downwardly through the air stream and through the open bottom of the hood.

2. A cotton cleaner and distributor for use in conjunction with a cotton harvester having an upwardly-directed cotton elevator housing with an upwardly-directed cotton conveyor therein and a cotton discharge opening facing downwardly and rearwardly of the housing for discharging downwardly and rearwardly of the elevator a stream of cotton comprising mature cotton, immature cotton and foreign matter, said cleaner and distributor including, an air duct, means for passing a stream of air through said duct, the duct having an air outlet directed upwardly and rearwardly and transversely of the stream of cotton issuing from the elevator discharge opening and in close proximity to said discharge opening, and a distributing hood carried at the upper end of the elevator in the path of the air stream flowing from the air outlet, the hood having a closed top and closed sides and an open bottom and an open rearward end, the rearward end of the hood being directed downwardly and rearwardly to confine and direct the air stream with entrained mature cotton rearwardly of the harvester and downwardly thereof, the immature cotton and foreign matter falling through the air stream and the open bottom of the hood and being urged rearwardly of the harvester by the air stream to a lesser degree than the mature cotton whereby the mature cotton is separated from the balance of the cotton stream and is distributed to a point rearward of the harvester different from the point to which the balance of the stream of cotton is distributed.

3. A cotton cleaner and distributor for use in conjunction with a cotton harvester having an upwardly-directed cotton elevator housing with an upwardly-directed cotton conveyor therein and a cotton discharge opening facing downwardly and rearwardly of the housing for discharging downwardly and rearwardly of the elevator a stream of cotton comprising mature cotton, immature cotton and foreign matter, said cleaner and distributor including, an air duct, means for passing a stream of air through said duct, the duct having an air outlet directed upwardly and rearwardly and transversely of the stream of cotton issuing from the elevator discharge opening and in close proximity to said discharge opening, and a distributing hood extending rearwardly and approximately horizontally from the upper end of the elevator above the discharge opening and the air duct outlet, the rearward end of the hood being open and the top and the sides of the hood being closed so as to intercept and deflect rearwardly and downwardly the air stream and mature cotton entrained therein, whereby the mature cotton is distributed rearwardly of the harvester in a relatively dense stream and to a point spaced rearwardly of the harvester an appreciable distance, the bottom of the hood being open to permit immature cotton and foreign matter to fall therethrough and be distributed to a point spaced rearwardly of the harvester and closer thereto than the mature cotton, whereby the mature cotton is separated from the balance of the cotton stream and distributed to a different point to maintain said separation.

4. A cotton cleaner and distributor as set forth in claim 3, wherein the top of the hood is curved upwardly adjacent the point of impingement of the air stream thereon to define a space in which cotton momentarily is whirled by the air stream to provide more complete separation of the mature cotton.

5. A cotton cleaner and distributor as set forth in claim 3, wherein the hood is provided with downwardly extending cheek plates upon its lower side along each side of and contiguous to the open bottom of the hood, the check plates converging toward one another.

6. A cotton cleaner and distributor as set forth in claim 3, wherein the hood is provided with downwardly extending check plates upon its lower side along each side of and contiguous to the open bottom of the hood, the cheek plates converging toward one another and defining a bottom opening for the hood which progressively reduces in area from the forward portion toward the rearward portion of the hood.

7. A cotton cleaner and distributor as set forth in claim 3, and an upwardly curved bottom wall disposed approximately horizontally between the sides of the hood at the lower portion thereof and extending from a point spaced rearwardly from the air outlet toward the rearward end of the hood.

8. A cotton cleaner and distributor as set forth in claim 3 wherein the hood is provided with a bottom wall for its rearward portion, said bottom wall commencing at a point spaced rearwardly from the air outlet and curving upwardly and rearwardly toward a horizontal plane at the rear end of the hood.

9. A cotton cleaner and distributor as set forth in claim 3, and a deflector plate extending upwardly and outwardly in the upper portion of the hood and being positioned so that the air stream from the air duct outlet impinges thereon.

10. A cotton cleaner and distributor as set forth in claim 3 wherein the air duct is provided at its outlet with an air nozzle adjustable in a vertical arc to vary the path of the air stream vertically in the hood.

11. A cotton classifier and cleaner for use in conjunction with a cotton harvester having an upwardly-directed cotton discharge elevator with an elevated discharge opening for directing rearwardly and downwardly of the harvester a stream of cotton comprising mature cotton, immature cotton and heavier bodies, said elevator being of the type having an endless elongate conveyor mounted on shafts in an elongate upwardly-directed housing with a closed upper end overlying the discharge opening and the upper end of the conveyor and spaced from said upper end of the conveyor, said classifier and cleaner including, a shield adapted to be positioned in the upper end of the elevator housing closely spaced to the path of travel of the conveyor and formed to conform substantially to said path of travel to aid in directing the cotton stream through the discharge opening, an air duct having an air outlet directed upwardly and rearwardly in close proximity to the discharge opening, the air outlet being arranged to direct its air stream transversely and upwardly through the downwardly and rearwardly moving stream of cotton flowing from the discharge opening, means for blowing a stream of air through the air duct, and a hood overlying the air outlet, said hood having a closed top and closed sides and extending rearwardly from the upper end of the elevator housing for receiving the air stream from the air duct outlet with mature cotton entrained therein and directing the same rearwardly and downwardly from the elevator, the immature cotton and heavier bodies falling downwardly through the air stream and through the open bottom of the hood.

LAMBUTH GROVES FOWLER.

References Cited in the file of this patent

UNITED STATES PATENTS

| Number | Name | Date |
| --- | --- | --- |
| 393,411 | Willis | Nov. 27, 1888 |
| 508,842 | Ruffin | Nov. 14, 1893 |
| 669,182 | Reynolds | Mar. 5, 1901 |
| 778,970 | Holland-Letz | Jan. 3, 1905 |
| 1,342,528 | Chancellor | June 8, 1920 |
| 1,356,777 | Mettler | Oct. 26, 1920 |
| 1,366,899 | Bell | Feb. 1, 1921 |
| 1,501,334 | Hanson | July 15, 1924 |
| 1,525,760 | Rushton | Feb. 10, 1925 |
| 1,787,835 | On | Jan. 6, 1931 |
| 2,026,910 | Olsen | Jan. 7, 1936 |
| 2,257,097 | Anderson | Sept. 30, 1941 |
| 2,292,650 | Oehler et al. | Aug. 11, 1942 |
| 2,502,817 | Bennett | Apr. 4, 1950 |

FOREIGN PATENTS

| Number | Country | Date |
| --- | --- | --- |
| 8,794 of 1932 | Australia | Mar. 6, 1933 |
| 377,308 | Italy | Dec. 15, 1939 |
| 63,258 | Denmark | Mar. 12, 1945 |